United States Patent
Kim et al.

(10) Patent No.: US 10,047,215 B2
(45) Date of Patent: Aug. 14, 2018

(54) POLYKETONE COMPOSITE RESIN COMPOSITIONS

(71) Applicants: HYUNDAI MOTOR COMPANY, Seoul (KR); DESCO CO., LTD., Waegwan-eup (KR)

(72) Inventors: SangWoo Kim, Anyang-si (KR); Junchan Lim, Daegu (KR); Jong-Hwal Kim, Daegu (KR)

(73) Assignees: Hyundai Motor Company, Seoul (KR); Desco Co., Ltd., Waegwan-eup (KR)

( * ) Notice: Subject to any disclaimer, the term of this patent is extended or adjusted under 35 U.S.C. 154(b) by 0 days.

(21) Appl. No.: 15/461,936

(22) Filed: Mar. 17, 2017

(65) Prior Publication Data

US 2018/0134874 A1 May 17, 2018

(30) Foreign Application Priority Data

Nov. 17, 2016 (KR) .......................... 10-2016-0153158

(51) Int. Cl.
| | |
|---|---|
| *C08K 3/32* | (2006.01) |
| *C08K 7/14* | (2006.01) |
| *C08L 61/02* | (2006.01) |
| *C08K 3/26* | (2006.01) |
| *C08K 13/04* | (2006.01) |

(52) U.S. Cl.
CPC .................. *C08K 7/14* (2013.01); *C08K 3/26* (2013.01); *C08K 3/32* (2013.01); *C08K 13/04* (2013.01); *C08L 61/02* (2013.01); *C08K 2003/265* (2013.01); *C08K 2003/325* (2013.01)

(58) Field of Classification Search
CPC ... C08K 7/14; C08K 3/36; C08K 3/32; C08K 13/04; C08L 61/02
See application file for complete search history.

(56) References Cited

U.S. PATENT DOCUMENTS

| | | |
|---|---|---|
| 5,122,564 A | 6/1992 | George |
| 7,402,625 B2 | 7/2008 | Cernohous et al. |
| 2009/0020914 A1* | 1/2009 | Nelson .................... C08L 23/06 264/294 |

FOREIGN PATENT DOCUMENTS

| | | |
|---|---|---|
| EP | 0322043 B1 | 6/1994 |
| KR | 1020060039398 A | 1/2005 |
| KR | 101655337 A | 11/2014 |

* cited by examiner

*Primary Examiner* — Hannah J Pak
(74) *Attorney, Agent, or Firm* — Lempia Summerfield Katz LLC

(57) ABSTRACT

A polyketone composite resin composition may include 40 to 70 wt % of a polyketone copolymer; and 30 to 60 wt % of a glass fiber, based on a total weight of the resin composition, wherein the polyketone composite resin composition further includes 0.1 to 3 phr of a processing stabilizer and 0.1 to 3 phr of a fluorine stabilizer.

8 Claims, 1 Drawing Sheet

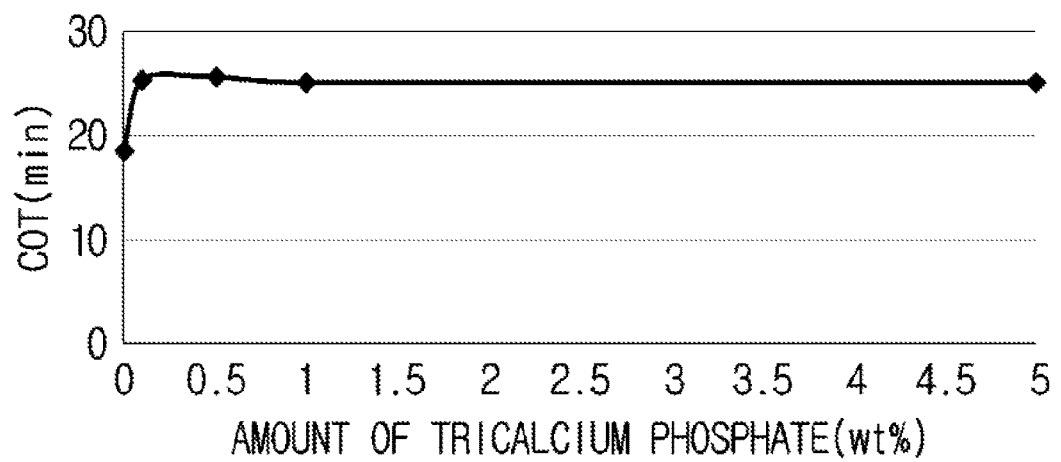

POLYKETONE COMPOSITE RESIN COMPOSITIONS

CROSS-REFERENCE TO RELATED APPLICATION(S)

This application claims the priority benefit of Korean Patent Application No. 10-2016-0153158, filed on Nov. 17, 2016 in the Korean Intellectual Property Office, the entire content and disclosure of which is incorporated herein by reference.

BACKGROUND

1. Field

Embodiments of the present disclosure relate to polyketone composite resin compositions applicable to plastic automotive parts and injection-molded materials using the polyketone composite resin compositions.

2. Description of the Related Art

With the recent introductions of stricter exhaust gas emission standards and higher fuel efficiency requirements by the government, considerable research efforts have been made in developing methods of increasing fuel efficiency. One of the methods is to reduce weights of automotive parts by using new materials and new manufacturing processes.

Research has been conducted on the development of plastic automotive parts. For example, conventional automotive parts, which are mainly made of metallic materials, have been replaced with lightweight plastic parts or plastic materials having low specific gravity have been developed to replace conventional plastic automotive parts.

SUMMARY

Therefore, it is an aspect of the present disclosure to provide a polyketone composite resin composition prepared by a pultrusion process including impregnating a glass fiber filler with a thermoplastic resin melt, as a long fiber reinforcing process, wherein the thermoplastic resin is a polyketone resin composition, and an injection-molded material using the same.

Additional aspects of the disclosure will be set forth in part in the description which follows and, in part, will be obvious from the description, or may be learned by practice of the disclosure.

One aspect of a polyketone composite resin composition includes 40 to 70 wt % of a polyketone copolymer and 30 to 60 wt % of a glass fiber, based on a total weight of the resin composition. The polyketone composite resin composition further includes 0.1 to 3 parts per hundred resin (phr) of a processing stabilizer and 0.1 to 3 phr of a fluorine stabilizer.

The glass fiber may include a long glass fiber.

The processing stabilizer may include tricalcium phosphate.

The polyketone composite resin composition may include 0.1 to 5 phr of a pigment.

The pigment may include a black pigment masterbatch having carbon black, a polyethylene wax, and a polyethylene resin.

One aspect of an injection-molded material includes a polyketone composite resin composition having 40 to 70 wt % of a polyketone copolymer and 30 to 60 wt % of a glass fiber, based on a total weight of the resin composition, wherein the polyketone composite resin composition further includes 0.1 to 3 phr of a processing stabilizer and 0.1 to 3 phr of a fluorine stabilizer.

The glass fiber may include a long glass fiber.

The processing stabilizer may include tricalcium phosphate.

The injection-molded material may further include 0.1 to 5 phr of a pigment.

The pigment may include a black pigment masterbatch having carbon black, a polyethylene wax, and a polyethylene resin.

BRIEF DESCRIPTION OF THE DRAWINGS

These and/or other aspects of the disclosure will become apparent and more readily appreciated from the following description of the embodiments, taken in conjunction with the accompanying drawings of which:

FIG. 1 depicts a graph illustrating COT measurement results with respect to the amount of tricalcium phosphate, according to one example.

DETAILED DESCRIPTION

Reference will now be made in detail to the embodiments of the present disclosure, examples of which are illustrated in the accompanying drawings, wherein like reference numerals refer to like elements throughout.

In the following description of the present disclosure, a detailed description of known functions and configurations incorporated herein will be omitted when it may make the subject matter of the present disclosure rather unclear.

Also, it is to be understood that the terms "include" or "have" are intended to indicate the existence of elements disclosed in the specification, and are not intended to preclude the possibility that one or more other elements may exist or may be added.

As used herein, the singular forms "a", "an" and "the" are intended to include the plural forms as well, unless otherwise stated.

A polyketone composite resin composition and an injection-molded material using the same according to an embodiment may be used to manufacture automotive parts to reduce weights of the parts of vehicles. For example, the polyketone composite resin composition and injection-molded material may be applied to pedal assemblies such as a clutch, a brake, and an accelerator; an engine oil pan; a timing chain cover, and the like of vehicles. However, types of automotive parts to which the polyketone composite resin composition is applied are not limited thereto.

Hereinafter, operation principles and embodiments of the present disclosure will be described in more detail with reference to the accompanying drawings.

The polyketone composite resin composition according to an embodiment includes 40 to 70 wt % of a polyketone copolymer and 30 to 60 wt % of a glass fiber based on a total weight of the resin composition. The polyketone composite resin composition may further include 0.1 to 3 parts per hundred resin (phr) of a processing stabilizer and 0.1 to 3 phr of a fluorine stabilizer. According to an embodiment, the polyketone composite resin composition may further include 0.1 to 5 phr of a pigment.

Polyketone may be a terpolymer (or more) including carbon monoxide, an ethylenically unsaturated compound, and at least one olefinic unsaturated hydrocarbon compound. For example, a polyketone copolymer may have a structure in which a carbon monoxide repeating unit, a repeating unit of an ethylenically unsaturated compound, and a repeating unit of a propylenically unsaturated compound are connected by turns. Polyketone having this structure has excellent mechanical properties, thermal properties, processability, impact resistance, abrasion resistance, chemical resistance, calcium chloride resistance, anti-freezer resistance, moisture resistance, and gas barrier properties.

When polyketone is formed as a terpolymer or a copolymer including four or more monomeric units, the polyketone copolymer may be efficiently used as an economical engineering plastic material with high processability and excellent thermal properties. A composite material in which the polyketone copolymer and the glass fiber are combined, has high rigidity, thereby being efficiently used to manufacture automotive parts.

The polyketone copolymer may be included in the resin composition in an amount of 40 to 70 wt % based on the total weight of the resin composition. If the amount of the polyketone copolymer is less than 40 wt %, processability and molding efficiency may decrease resulting in difficulty in molding products. On the contrary, if the amount of the polyketone copolymer is greater than 70 wt %, properties of the material are sufficiently acquired by conventional fiber. Thus, the amount of the polyketone copolymer may be adjusted appropriately depending on desired properties of the polyketone composite material.

Glass fiber is mineral fiber produced from molten glass in a fibrous shape. Glass fiber has high heat resistance, flame retardancy, low hygroscopic property, high chemical resistance, high abrasion resistance, and high tensile strength. Due to these properties, glass fiber may be compounded with a polymer to develop an engineering plastic material.

According to an embodiment, long glass fiber is used. The long glass fiber has high dispersibility in the resin composition, increases quality of pellets, provides high mechanical strength, and is less deformed by temperature and moisture due to low coefficient of thermal expansion. By using the long glass fiber having these properties, a lightweight composite material having excellent molding properties of the polyketone copolymer and high impact strength of the glass fiber may be provided according to an embodiment.

The glass fiber may be included in the resin composition in an amount of 30 to 60 wt %. If the amount of the glass fiber is less than 30 wt %, physical properties of the polyketone composite material such as impact strength may deteriorate. If the amount of the glass fiber is greater than 60 wt %, processability and molding efficiency may decrease resulting in difficulty in molding products. Thus, the amount of the glass fiber may be adjusted appropriately depending on desired properties of the polyketone composite material.

The processing stabilizer may include tricalcium phosphate represented by Formula 1 below.

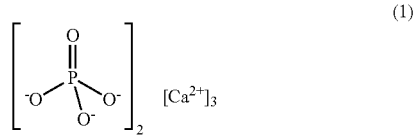

(1)

Tricalcium phosphate may delay increase in viscosity of the polyketone copolymer and gelation thereof at a high temperature and minimize damage of the glass fiber to allow the polyketone composite resin composition to have a low specific gravity. Tricalcium phosphate manufactured by Budenheim and having a density of 3.14 g/cm$^3$ and a melting point (Tm) of 1.391° C. may be used therefor.

Tricalcium phosphate may be melt-blended with the polyketone copolymer to improve processing thermal stability. Improvement of processing thermal stability may be analyzed by measuring crossover time (COT).

FIG. 1 is a graph illustrating COT measurement results with respect to the amount of tricalcium phosphate. The COT illustrated in FIG. 1 is used as an index of processing stability by measuring gel time by rotating a spindle at a frequency of 1 rad/sec until a storage modulus of the polyketone composite resin composition becomes the same as a loss modulus thereof.

Table 1 shows COT values with respect to the amount of tricalcium phosphate.

TABLE 1

| | Amount of tricalcium phosphate (wt %) | | | | |
|---|---|---|---|---|---|
| | 0 | 0.1 | 0.5 | 1.0 | 5 |
| COT (min) | 18.5 | 25.4 | 25.6 | 25.1 | 25.2 |

Referring to FIG. 1, as the amount of tricalcium phosphate increases, a delay time for gelation increases, indicating that processing stability is increased. However, if the amount of tricalcium phosphate is greater than 3 phr, the effect of increasing COT is negligible. Meanwhile, if the amount of tricalcium phosphate is less than 0.1 phr, processing stability may not be increased. Thus, the amount of tricalcium phosphate may be adjusted appropriately depending on desired properties of the polyketone composite resin composition.

The fluorine stabilizer may be added thereto to enhance thermal stability and prevent gelation of a die. For example, the fluorine stabilizer may include 88 to 92 parts by weight of 1-propene, 1,1,2,3,3,3,-hexafluoro-, polymer with 1,1,-difluoroethene, 4 to 9 parts by weight of non-asbestos form talc, and 1 to 4 parts by weight of synthetic amorphous silica. According to an embodiment, the fluorine stabilizer may include 2 wt % or less of carbonic acid calcium salt.

The fluorine stabilizer may be included therein in an amount of 0.1 to 3 phr according to processing conditions. If the amount of the fluorine stabilizer is less than 0.1 phr, the effects of enhancing thermal stability and preventing gelation of the die may not be obtained. On the contrary, if the amount of the fluorine stabilizer is greater than 3 phr, the effect of using the fluorine stabilizer is negligible and physical properties of the material may deteriorate. Thus, the amount of the fluorine stabilizer may be adjusted appropriately.

The pigment may be added to a polyketone composite material to realize black color. For example, the pigment may be a black pigment masterbatch including 50 wt % of carbon black, 17 wt % of polyethylene wax, and 33 wt % of polyethylene resin. However, the types of the pigment are not limited thereto, and components and composition ratios thereof may be adjusted in various manners in accordance with a color to be realized.

The amount of the pigment may be in the range of 0.1 to 5 phr depending processing conditions. If the amount of the pigment is less than 0.1 phr, it may be difficult to realize a color in the polyketone composite material. On the contrary, if the amount of the pigment is greater than 5 phr, mechanical properties of the material may deteriorate. Thus, the range of utilization of polyketone may be adjusted in various manners according to processing conditions.

Components of the polyketone composite resin composition according to an embodiment have been described above. However, types and composition ratios of the polyketone composite resin composition are not limited thereto and it may be understood that any modifications obvious to those of ordinary skill in the art are included therein.

Hereinafter, one or more exemplary embodiments of the present disclosure will be described in detail with reference to test results of physical properties of polyketone composite resin compositions prepared according to the following examples and comparative examples.

Samples of polyketone composite resin compositions were prepared according to Examples 1 to 8 and Comparative Examples 1 to 4 respectively including components as listed in Tables 2 to 4 and physical properties thereof were measured.

TABLE 2

| Item | Example 1 | Example 2 | Example 3 | Example 4 |
|---|---|---|---|---|
| polyketone copolymer (wt %) | 50 | 40 | 60 | 70 |
| long glass fiber (wt %) | 50 | 60 | 40 | 30 |
| short glass fiber (wt %) | 0 | 0 | 0 | 0 |
| processing stabilizer (phr) | 1.0 | 1.0 | 1.0 | 1.0 |
| fluorine stabilizer (phr) | 0.5 | 0.5 | 0.5 | 0.5 |
| pigment (phr) | 0.3 | 0.3 | 0.3 | 0.3 |

TABLE 3

| Item | Example 5 | Example 6 | Example 7 | Example 8 |
|---|---|---|---|---|
| polyketone copolymer (wt %) | 50 | 40 | 60 | 70 |
| long glass fiber (wt %) | 50 | 60 | 40 | 30 |
| short glass fiber (wt %) | 0 | 0 | 0 | 0 |
| processing stabilizer (phr) | 0 | 0 | 0 | 0 |
| fluorine stabilizer (phr) | 0.5 | 0.5 | 0.5 | 0.5 |
| pigment (phr) | 0.3 | 0.3 | 0.3 | 0.3 |

TABLE 4

| Item | Comparative Example 1 | Comparative Example 2 | Comparative Example 3 | Comparative Example 4 |
|---|---|---|---|---|
| polyketone copolymer (wt %) | 40 | 50 | 60 | 70 |
| long glass fiber (wt %) | 0 | 0 | 0 | 0 |
| short glass fiber (wt %) | 60 | 50 | 40 | 30 |
| processing stabilizer (phr) | 0 | 0 | 0 | 0 |
| fluorine stabilizer (phr) | 0.5 | 0.5 | 0.5 | 0.5 |
| pigment (phr) | 0.3 | 0.3 | 0.3 | 0.3 |

More particularly, the polyketone composite resin compositions prepared according to Examples 1 to 8 and Comparative Examples 1 to 4 were mixed using a Henschel mixer and uniformly dispersed.

Then, the dispersed polymer compositions were extruded into pellets by using a twin screw extruder at a temperature of 220 to 240° C. More particularly, the extruding was performed at a water tank temperature of 30° C., a motor speed of 250 rpm, and a load of 80 or less. The temperature was maintained in the range of 220 to 240° C. in a hopper region, in the range of 220 to 240° C. in a mixing region, and at 240° C. in a die region during the extruding. Then, the pellets were dried in an oven and injection-molded to prepare samples for testing physical properties thereof.

The physical properties of the samples were measured in the following method.

First, as physical properties, specific gravity of the samples was measured according to ISO 1183, and Ash of the samples was measured according to ISO 3451-1.

Also, as mechanical properties, tensile strength, tensile elongation at break point, and tensile modulus of the samples were measured according to ISO 527, flexural stress and flexural modulus of the samples were measured according to ISO 178, and Izod impact strength of the samples was measured according to ISO 179.

The results of measuring physical properties of the samples are shown in Tables 5 and 6.

TABLE 5

| | Item | Example 1 | Example 2 | Example 3 | Example 4 |
|---|---|---|---|---|---|
| Physical properties | Specific gravity | 1.67 | 1.69 | 1.55 | 1.44 |
| | Ash | 51 | 60 | 40 | 31 |
| Mechanical properties | Tensile strength | 210 | 248 | 157 | 144 |
| | Tensile elongation at break point | 1.6 | 1.4 | 2.1 | 2.4 |
| | Tensile modulus | 17,100 | 20,690 | 11,005 | 8,465 |
| | Flexural stress | 280 | 318 | 240 | 207 |
| | Flexural modulus | 14,500 | 16,552 | 9,840 | 7,467 |
| | Izod impact strength | 28 | 32 | 24 | 19 |

TABLE 6

| | Item | Example 5 | Example 6 | Example 7 | Example 8 |
|---|---|---|---|---|---|
| Physical properties | Specific gravity | 1.67 | 1.69 | 1.55 | 1.44 |
| | Ash | 51 | 60 | 40 | 31 |
| Mechanical properties | Tensile strength | 190 | 228 | 137 | 124 |
| | Tensile elongation at break point | 1.6 | 1.4 | 2.1 | 2.4 |
| | Tensile modulus | 16,200 | 19,690 | 10,005 | 7,465 |
| | Flexural stress | 240 | 278 | 200 | 167 |
| | Flexural modulus | 13,800 | 15,852 | 9,140 | 6,767 |
| | Izod impact strength | 20 | 24 | 16 | 11 |

TABLE 7

| | Item | Comparative Example 1 | Comparative Example 2 | Comparative Example 3 | Comparative Example 4 |
|---|---|---|---|---|---|
| Physical properties | Specific gravity | 1.69 | 1.67 | 1.54 | 1.51 |
| | Ash | 60 | 50 | 40.1 | 35.5 |
| Mechanical | Tensile | 202 | 177 | 139 | 134 |

TABLE 7-continued

| Item | | Comparative Example 1 | Comparative Example 2 | Comparative Example 3 | Comparative Example 4 |
|---|---|---|---|---|---|
| properties | strength Tensile elongation at break point | 1.9 | 2.3 | 2.0 | 2.4 |
| | Tensile modulus | 17,100 | 15,200 | 13,450 | 12,540 |
| | flexural stress | 251 | 230 | 214 | 168 |
| | Flexural modulus | 14,136 | 12,513 | 9,097 | 6,895 |
| | Izod impact strength | 24 | 19.2 | 17 | 16 |

Referring to Tables 5 to 7, the following conclusions may be deduced based on the results of measuring physical properties of the samples prepared according to Examples 1 to 8, and Comparative Examples 1 to 4.

First, it was confirmed that the sample using the long glass fiber prepared according to Example 5 had a tensile strength of 190 Mpa, a tensile modulus of 16,200%, a flexural stress of 240 Mpa, a flexural modulus of 13,800 Mpa, and an Izod impact strength of 20 KJ/m$^2$, respectively higher than a tensile strength of 177 Mpa, a tensile modulus of 15,200%, a flexural stress of 230 Mpa, a flexural modulus of 12,513 Mpa, and an Izod impact strength of 19.2 KJ/m$^2$ of the sample using the short glass fiber prepared according to Comparative Example 2 under the same conditions.

Meanwhile, it was confirmed that the sample using the processing stabilizer prepared according to Example 1 had a tensile strength of 210 Mpa, a tensile modulus of 17,100%, a flexural stress of 280 Mpa, a flexural modulus of 14,500 Mpa, and an Izod impact strength of 28 KJ/m$^2$, respectively higher than a tensile strength of 190 Mpa, a tensile modulus of 16,200%, a flexural stress of 240 Mpa, a flexural modulus of 13,800 Mpa, and an Izod impact strength of 20 KJ/m$^2$ of the sample not using the processing stabilizer prepared according to Example 5 under the same conditions.

As a result, it was confirmed that a polyketone composite material prepared by using a long glass fiber and a processing stabilizer may have excellent physical properties.

As is apparent from the above description, the polyketone composite resin composition and the injection-molded material using the same according to an embodiment may improve mechanical properties of products and reduce the weights of products so as to be efficiently applied to plastic automotive parts.

The disclosure has been described in detail with reference to embodiments thereof. However, it will be appreciated by those skilled in the art that changes may be made in these embodiments without departing from the principles and spirit of the disclosure, the scope of which is defined in the appended claims and their equivalents. It is therefore intended that the foregoing description be regarded as illustrative rather than limiting, and that it be understood that all equivalents and/or combinations of embodiments are intended to be included in this description.

It is to be understood that the elements and features recited in the appended claims may be combined in different ways to produce new claims that likewise fall within the scope of the present disclosure. Thus, whereas the dependent claims appended below depend from only a single independent or dependent claim, it is to be understood that these dependent claims may, alternatively, be made to depend in the alternative from any preceding or following claim, whether independent or dependent, and that such new combinations are to be understood as forming a part of the present specification.

What is claimed is:

1. A polyketone composite resin composition comprising:
   40 to 70 wt % of a polyketone copolymer, based on a total weight of the resin composition;
   30 to 60 wt % of a glass fiber, based on the total weight of the resin composition;
   0.1 to 3 parts per hundred resin (phr) of a processing stabilizer;
   0.1 to 3 phr of a fluorine stabilizer, and
   0.1 to 5 phr of a pigment,
   wherein the pigment is a black pigment masterbatch comprising carbon black, a polyethylene wax, and a polyethylene resin.

2. The polyketone composite resin composition of claim 1, wherein the processing stabilizer comprises tricalcium phosphate.

3. The polyketone composite resin composition of claim 1, wherein the processing stabilizer comprises tricalcium phosphate.

4. The polyketone composite resin composition of claim 1, wherein the black pigment masterbatch is 50 wt % of the carbon black, 17 wt % of the polyethylene wax, and 33 wt % of the polyethylene resin.

5. The polyketone composite resin composition of claim 1, wherein the fluorine stabilizer comprises 2 wt % or less of a carbonic acid calcium salt.

6. A polyketone composite resin composition comprising:
   40 to 70 wt % of a polyketone copolymer, based on a total weight of the resin composition;
   30 to 60 wt % of a glass fiber, based on the total weight of the resin composition;
   0.1 to 3 parts per hundred resin (phr) of a processing stabilizer;
   0.1 to 3 phr of a fluorine stabilizer,
   wherein the fluorine stabilizer includes
   88 to 92 parts by weight of 1-propene, 1,1,2,3,3,3-hexafluoro-, polymer with 1,1-difluoroethane,
   4 to 9 parts by weight of non-asbestos form talc, and
   1 to 4 parts by weight of synthetic amorphous silica.

7. An injection-molded material comprising:
   a polyketone composite resin composition having
      40 to 70 wt % of a polyketone copolymer, based on a total weight of the resin composition,
      30 to 60 wt % of a glass fiber, based on the total weight of the resin composition,
      0.1 to 3 parts per hundred resin (phr) of a processing stabilizer,
      0.1 to 3 phr of a fluorine stabilizer, and
      0.1 to 5 phr of a pigment,
   wherein the pigment is a black pigment masterbatch comprising carbon black, a polyethylene wax, and a polyethylene resin.

8. The injection-molded material of claim 7, wherein the processing stabilizer comprises tricalcium phosphate.

* * * * *